UNITED STATES PATENT OFFICE.

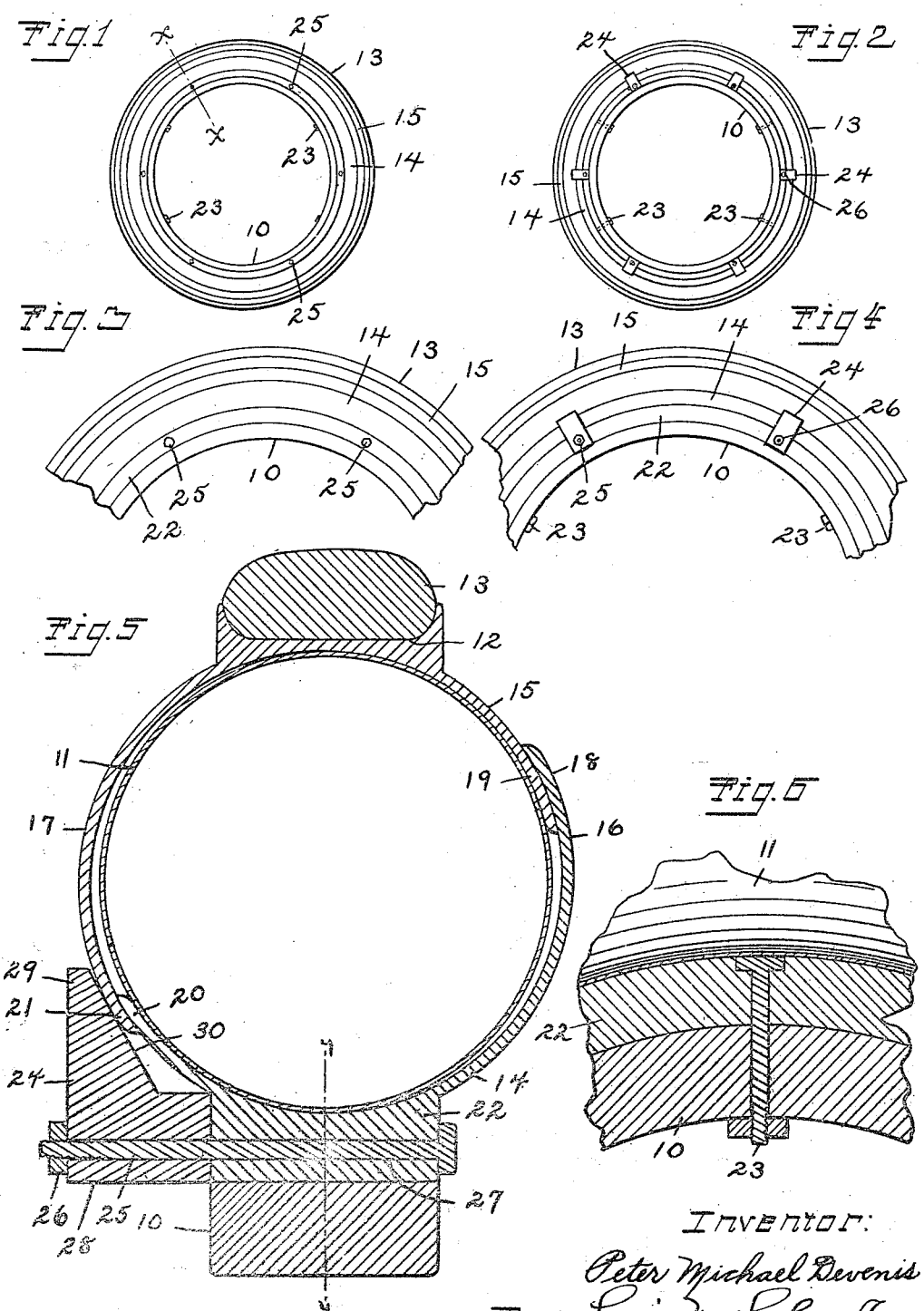

PETER M. DEVENIS, OF WATERBURY, CONNECTICUT.

TIRE STRUCTURE.

1,245,090.　　　　　Specification of Letters Patent.　　Patented Oct. 30, 1917.

Application filed March 3, 1917. Serial No. 152,399.

*To all whom it may concern:*

Be it known that I, PETER MICHAEL DEVENIS, a citizen of the United States, residing at Waterbury, in the county of New Haven and State of Connecticut, have invented certain new and useful Improvements in Tire Structures, of which the following is a specification.

My invention relates to improvements in tire structures, and the object of my improvement is to produce a tire structure suitable for use on wheels of automobiles, and which has incorporated within the structure a pneumatic inner tube, and is constructed so as to obtain substantially all the advantages of a pneumatic tire, and at the same time the inner tube is shielded against being punctured by nails, glass and other damaging objects and materials such as are liable to be encountered on the roadway.

In the accompanying drawing:—

Figure 1 is a side elevation of a tire structure and part of a wooden felly of a wheel embodying my invention.

Fig. 2 is a view of the other side of the same.

Fig. 3 is a side elevation, on an enlarged scale, of part of the structure shown in Fig. 1.

Fig. 4 is a similar view of part of the structure shown in Fig. 2.

Fig. 5 is a sectional view on the line *x x* of Fig. 1.

Fig. 6 is a sectional view on the line *y y* of Fig. 5.

My improved tire structure comprises a metal casing that is mounted on the wooden felly 10 of a wheel for an automobile, and incloses a pneumatic inner tube 11 of rubber suitable for being inflated, and which may be provided on the periphery with a circumferential channel 12 in which is seated a solid tire 13, that serves as the tread portion of the tire structure.

The inner tube 11 is entirely inclosed within the casing and in order to permit of access thereto and to permit of free movement due to the combination of the load and the resiliency of the tube the said casing is made of two parts, comprising the inner part 14 that is mounted on the felly 10 and the outer part 15 that is provided with the channel 12 for the hard rubber tire 13, the said two parts having overlapping edge portions and being provided with means for being secured to the wooden felly 10 that will permit of a limited amount of relatively free movement of the two parts 14 and 15.

The body portion of the parts 14 and 15 combine to form a housing of approximately circular cross-section, the body portion 16 of the inner part 14 being of about the same dimensions as the body portion 17 of the outer part 15, each comprising a semi-circle in extent and an appreciable excess to provide for the overlapping edges.

The overlapping edges are positioned and arranged as follows:—

A pair of overlapping edges is positioned on the side, shown at the right in Fig. 5, near the outer portion, radially, of the structure, the edge portion 18 of the body portion 16 of the inner member 14 being outside of and overlapping the edge 19 of the body portion 17 of the outer part 15.

Then there is another pair of edges overlapping in a generally similar manner, except that the edge 20 of the inner part 14 is on the inner side relatively to the edge 21 of the outer part 15.

The inner part 14 is provided along the inner border with a rim portion 22 that is suitably shaped to be seated on the wooden felly 10 generally after the manner of the metal rims as are in common use.

A set of radial bolts 23, shown as four in number, serve to hold the inner part 14 to the wooden wheel structure through the medium of the rim portion 22 and the wooden felly 10.

As means for holding the two parts of the casing together I provide a set of clips 24, shown as six in number, secured in position by bolts 25 and nuts 26.

The bolts 25 extend transversely across the wooden felly 10, passing through the suitable holes 27 therein, the heads being on the right, and on the threaded portion at the left are mounted the clips 24 mentioned, as shown in Fig. 5.

The said clips 24 comprise a body portion 28 that is mounted directly on the bolts 25 and an ear 29 that extends outwardly outside of the edge portion 21 of the outer part 15 and having a bearing surface 30 on the side opposed to the said edge portion 21 that is in bearing engagement therewith.

The bearing surface 30 is generally flat and of such length as to permit of a limited relative outward and inward movement of the overlapping edge portions 20 and 21 adjacent thereto, and at the same time serves in coöperation with the inner tube to hold the two parts that compose the casing together when the inner tube is inflated.

As described, the inner part 14 is permanently and rigidly secured to the wooden felly 10, and the outer part 15 is locked in place between the overlapping edge portion 18 of the inner part 14 on one side, adjacent the periphery, and the bearing surfaces 30 of the clips 24 on the other side, adjacent the wooden felly.

In operation the overlapping edge portions 18 and 19 on one side and 20 and 21 on the other side operate as sliding surfaces, so as to permit of limited relative movement of the two parts 14 and 15 responsive to movements due to deflection or deformation of the inner tube when in use.

The cross-section of the interior space, within the body portions of the two parts 14 and 15, and of the inner tube housed therein, when inflated, is generally circular, as shown, it being understood that some other suitable form for the same may be used.

Also, other changes may be made from the particular construction shown and described without departing from the spirit and scope of my invention as claimed.

Considering the tire and rim structure as a whole, it will be noted that the same comprises as a fixed part the unit composed of the wooden felly and the inner part 14 and as a movable part the unit composed of the outer part 15 and the solid tire mounted thereon, the said two units having overlapping parts suitable for housing the inner tube, and, furthermore, the said two units are brought together somewhat after the manner of a cover to a container. There is involved in the construction of the present invention, however, a characteristic and fundamental difference, in that there are two lines of contact for the engaging parts, in spaced relation, suitable for receiving and housing the inner tube therebetween. As the said lines of contact are circular or circumferential, in order to permit of overlapping parts, as is necessary from a practical standpoint, whereby in lieu of strictly lines or circles of contact, there are provided zones of contact of annular form, formed by the said overlapping parts, one zone being on each side of the axis of the cross-section of the tire, and one zone is of greater diameter than the other. The two zones are brought to the closed position by relative movement of the two units bodily in parallelism with the axis of the wheel structure, after the manner of applying a free cover to a container.

I claim as my invention:—

1. In combination in a tire structure, a casing comprising an inner part for being secured to the wooden felly of a wheel, and an outer part for coöperating with the said inner part and having a tread portion on the periphery, the said parts having overlapping edge portions on opposite sides in sliding engagement, an inner tube housed within the said parts, a set of clips supported by the said felly, and the said outer part being held in operative position by one of the said overlapping edge portions of the inner part on one side and the said clips on the other side.

2. In a tire structure, a divided casing structure for inclosing an inner tube, composed of two parts, the said parts having overlapping portions arranged in two zones, one on each side of the axis of the cross-section of the tube structure, each of the said zones being of annular form, and the zone of one of the said overlapping portions being of greater diameter than the other, suitably to permit the said parts to be brought together by a body movement in parallelism with the axis of the wheel structure.

3. In combination in a wheel and tire structure, a fixed unit composed of a felly and an inner casing part mounted thereon, a movable unit composed of an outer casing part and a hard tire mounted thereon, means for holding the said units together, the said casing parts having means for housing an inner tube, comprising coöperating shell-like parts, of semi-circular cross-section, and having overlapping border portions, and the said overlapping border portions being arranged in two zones, of annular form, and one of greater diameter than the other, suitably to provide clearance for assembling the two parts.

PETER M. DEVENIS.

Copies of this patent may be obtained for five cents each, by addressing the "Commissioner of Patents, Washington, D. C."